United States Patent [19]

Labbé

[11] Patent Number: 4,978,162
[45] Date of Patent: Dec. 18, 1990

[54] DRAG REDUCER FOR REAR END OF VEHICLE

[76] Inventor: François P. Labbé, 4531, St-Joseph, Apt. 6, Drummondville, Quebec J2B 1A1, Canada

[21] Appl. No.: 442,894

[22] Filed: Nov. 29, 1989

[51] Int. Cl.⁵ ............................................. B62D 35/00
[52] U.S. Cl. ............................... 296/180.2; 296/180.4
[58] Field of Search ........................... 296/180.2, 180.4

[56] References Cited

U.S. PATENT DOCUMENTS

| | | | |
|---|---|---|---|
| 2,737,411 | 3/1956 | Potter | 296/180.4 |
| 4,036,519 | 7/1977 | Servais et al. | 296/180.2 |
| 4,741,569 | 5/1988 | Sutphen | 296/180.4 |

FOREIGN PATENT DOCUMENTS 3115742  11/1982  Fed. Rep. of Germany ... 296/180.4

Primary Examiner—Robert R. Song
Attorney, Agent, or Firm—Roland L. Morneau

[57] ABSTRACT

A drag reducer adapted to be mounted on the rear face of a land vehicle. It is characterized by a large piece of flexible material adapted to be tightly fixed around the periphery of the rear surface adjacent the lateral faces of the truck. The piece of material has an area larger than the rear face of the truck so as to display a convex surface when fully extended. The drag reducer has one and preferably two openings located adjacent the periphery of the rear face of the truck and a tubular extends from each of the said opening in a direction towards the front of the truck so that upon forward movement of the truck, air is automatically introduced in said tubular members and projected between the rear face of the truck and automatically forming a plano-convex air bag which reduces the drag behind the truck.

7 Claims, 3 Drawing Sheets

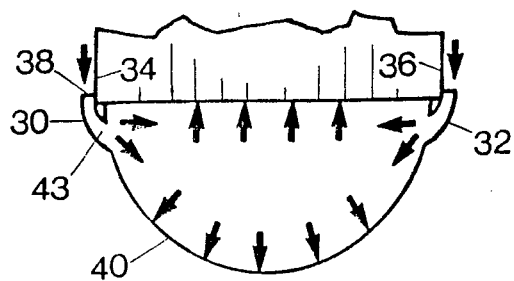
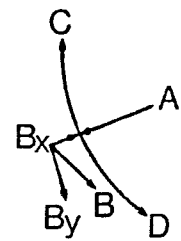
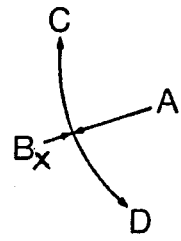
FIG.4　　　　FIG.5　　FIG.6
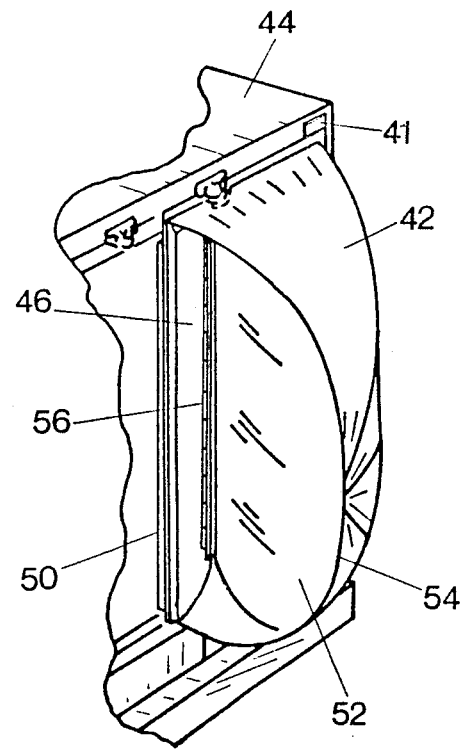
FIG.7 a patent page

DRAG REDUCER FOR REAR END OF VEHICLE

BACKGROUND OF THE INVENTION

1. Field of the Invention

The invention is directed to an inflatable appendage located at the rear of a vehicle and especially of a truck or trailer having a flat rear surface. The appendage modifies the aerodynamic shape of a truck so that the low pressure created at the rear of a moving truck which produces a drag on the latter, is replaced by a zone of high pressure. The present appendage which acts as a drag reducer operates in an autonomous manner without assistance from the vehicle operator.

2. Prior Art

U.S. Pat. No. 4,741,569 discloses an inflatable drag reducer made of non-porous air bags inflated with a blower motor.

In U.S. Pat. No. 4,236,745, metal tubing, are used to support adjacent sleeve members, thereby necessitating an elaborate and heavy structure.

The appendage contemplated by Paul D. Kerian in U.S. Pat. No. 4,601,508 requires a duct beneath the truck to supply air to the plenum chamber (col. 4, line 23) at the center of the rear of the truck.

E. L. Keedy discloses in U.S. Pat. No. 4,142,755 a drag reducer made of an assembly of rods or rigid panels hingedly mounted on the rear surface of the truck. These elements maintain the shape of the drag reducer with little use of an air scoop which is not described and which may have a preventive use only.

SUMMARY OF THE INVENTION

The drag reducer according to the invention is adapted to be fixed to the flat rear face of a land vehicle. It is characterized by a piece of flexible material fixed to the periphery of the rear face of the vehicle and having an area adapted to produce a plano-convex air bag when the latter is inflated. The air is introduced in the air bags through air inlet tubular members extending on the lateral faces of the vehicle and forwardly opening in the direction of movement of the vehicle. The air entering the tubular members, when the vehicle is moving, inflates the air bag.

Very little air flows through the flexible material and its periphery and is constantly replaced by the air penetrating through the tubular members.

The rear face of the vehicle is usually made of two doors and each door is covered by its own air bag. Each bag has its middle partition and the two partitions are adjacent and abutting against each other.

BRIEF DESCRIPTION OF THE DRAWINGS

FIG. 4 is a horizontal cross-sectional of the drag reducer shown in FIG. 3; FIGS. 5 and 6 are vectorial representation of the forces exerted on the periphery of the drag reducer;

FIG. 7 is a perspective view of one half of a split drag reducer;

DETAILED DESCRIPTION OF THE INVENTION

Figure 1:
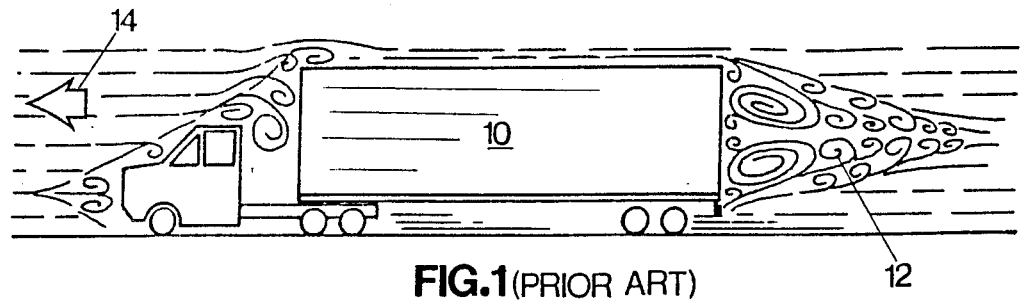
FIG. 1 is a side view of a moving truck and the usual surrounding air flow.

It is known that a truck, a van or the like having a flat rear panel produces a turbulence behind the rear panel when the truck is moving forwardly. FIG. 1 illustrates the air turbulence 12 when a truck 10 is moving in the direction of the arrow 14. This air turbulence 12 is characterized by a zone of low pressure which produces a drag on the truck, therefore reducing its speed and increasing the gaz consumption of the truck.

Figure 2:
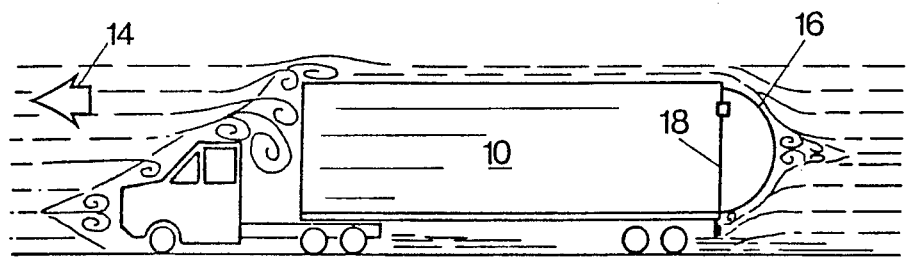
FIG. 2 is a side view of a truck as in FIG. 1 on which a drag reducer is mounted and the improved surrounding air flow.

It has been found that the drag on the truck can be reduced by installing a drag reducer 16 on the rear panel 18 of the truck 10 as illustrated in FIG. 2 when the truck moves in the direction of the arrow 14.

Figure 3:
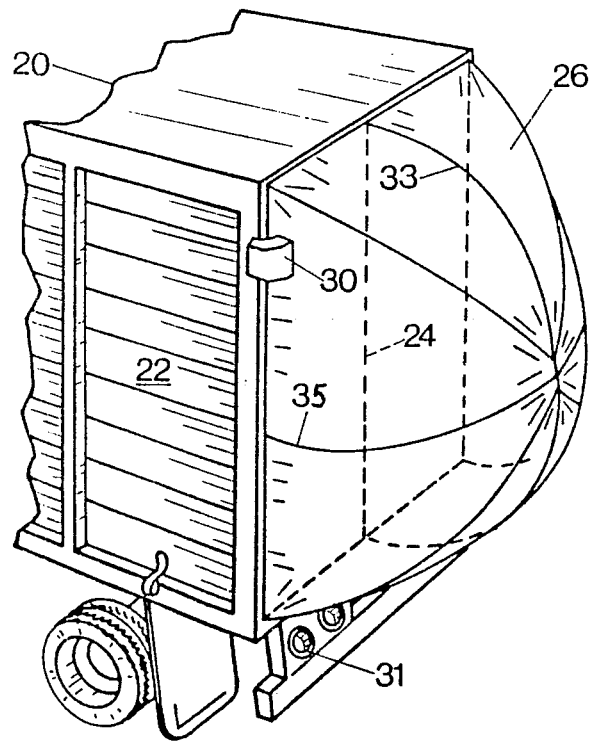
FIG. 3 is a perspective view of an inflated drag reducer according to the invention mounted behind a truck.

One embodiment of the drag reducer according to the invention is illustrated in FIG. 3. In this embodiment, the truck 20 has a side door 22 adjacent the rear panel 24 which is completely closed by the drag reducer 26. The drag reducer 26 is made of a piece of flexible material such as nylon cloth which may be completely or partially air tight and which, when inflated, has substantially semi-spherical shape. The cloth constituting the drag reducer folds itself loosely when not inflated and drops along the rear panel 24. The inflation of the drag reducer 26 takes place through a pair of channels 30 and 32 located adjacent the side of the truck 34 and 36. The channels 30 and 32 are opened at both ends. The front end is located adjacent the side 34 of the truck and allows the air to be introduced into the channel 30 and to flow into the drag reducer 26. The latter displays a substantially semi-circular cross-section, whether the cross-section is horizontal, vertical or in between at 45°. The semi-circular contour 40 of the drag reducer extends substantially from the side panels 34 and 36 of the truck. The tubular members 30 and 32 are generally curved so as to define a passage between a forward inlet 38 adjacent the side panel 34 and an outlet 43 through the drag reducer defined by the contour 40 as shown in FIG. 4. Although, two channels such as 30 and 32 are preferred, one is sufficient.

When the drag reducer has a semi-spherical volume such as illustrated in FIG. 4, the internal pressure on the peripheral walls is substantially identical for every portion of the surface. The contour 40 is also under the influence of an external pressure.

A vectorial representation of the forces exerted on the periphery of the drag reducer as schematically shown in FIGS. 5 and 6 identifies a substantially radial internal pressure by letter A. The letters C and D identify the fabric used to make the drag reducer. Although the internal pressure A and the external pressure B on the fabric are equal in force, they are not the same in their direction. B is the vector representing the action of the surrounding air and is substantially tangential to the fabric CD. The value of B must be divided in the two coordinates Bx and By in order to obtain the external real pressure exerted on the textile of the drag reducer. The vector Bx as shown in FIG. 6 is the one which is opposed to vector A corresponding to the internal pressure. The length of the vector A compared to the length of the vector Bx shows that it is possible to obtain a rigid surface of the drag reducer. The resistance of the fabric compensates the internal flow of air with the tangential external flow caused by the movement of the vehicle.

This combination produces an aerodynamic deflector having a variable internal pressure as well as a variable tension on the textile forming the drag reducer and this pressure and tension are automatically obtained to provide a complete autonomy on the performance of the drag reducer. Accordingly, the present drag reducer needs no mechanical support or external manual operation.

Figure 8:
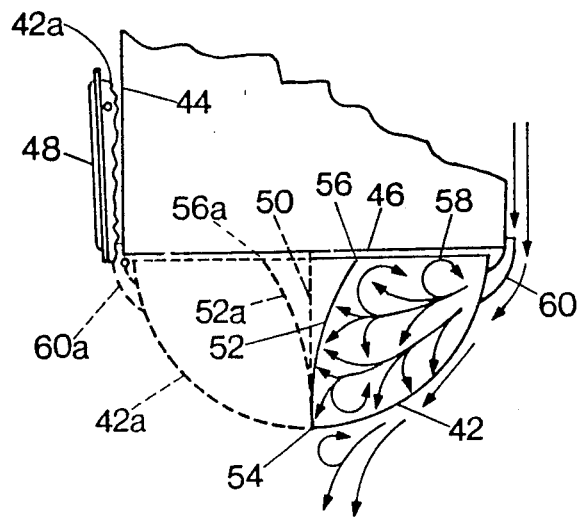
FIG. 8 is a horizontal cross-sectional view of the drag reducer shown in FIG. 7.

FIG. 7 shows an isometric view of the drag reducer which corresponds to one quarter of a sphere. This representation corresponds to the cross-sectional view shown in FIG. 8. The drag reducer 42 as shown in FIGS. 7 and 8 are used when the truck or van 44 is provided with doors 46 and 48 which are adapted to be opened along a central vertical line 50. Each half 42 and 42a of the drag reducer are respectively provided with a central partition 52 and 52a which closes each of the portions of the drag reducer. The two halves 42 and 42a of the drag reducer are easily provided with a central partition 52 and 52a which spreads from each other from the external contour 54 to a line 56 and 56a away from the central line 50. With this arrangement, the internal pressure such as identified by 58 can exert a tension on all peripheral surfaces of both halves 42 and 42a of the drag reducers and especially along the central partitions 52 and 52a.

With this arrangement, the doors can be fully opened along the side 44 of the truck as shown in the position 48 while allowing the drag reducer to fold between the door 48 and the side 44 of the truck. When the air is allowed to fill the halves 42 and 42a of the drag reducer, the two central partitions 52 and 52a do not hinder each other when the doors are closed.

As it may be seen from the position of the door 48 on the left-hand side of the truck in FIG. 8, the air inlet 60a is also folded against the side of the truck for this purpose, it is preferable that the air inlet 60 and 60a be made of flexible material and preferably of a material identical to the material or textile used to form the drag reducer.

Figure 10:
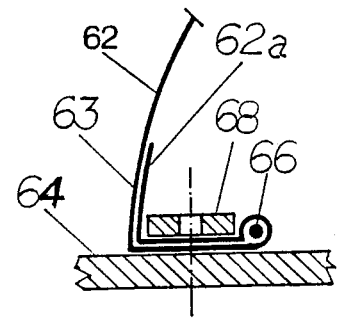
FIG. 10 is a sectional view of the mounting arrangement between the drag reducer and the rear of the truck.

The textile of the drag reducer is substantially sealed to each door around its periphery and preferably in a manner identified in FIG. 10. Considering that the textile 62 forming the drag reducer is constantly under tension in operation, a seal must be maintained between the fabric and the door as illustrated in FIG. 10. For this purpose, the textile 62 is folded over a flexible cable 66 and a portion of the double-folded textile adjacent the flexible cable 66 is fixed against the door with a securing plate 68 preferably held by screws (not shown). The double-folded textile can be additionally maintained in place by sewing the edge 62a with the outer portion 63 adjacent the securing plate 68. Obviously, the sewing may be replaced by glue or by a fusing process. The plates such as 68 are disposed around the doors so as not to interfere any moving parts of the doors nor with the signaling tail lights such as identified by reference number 41 in FIG. 7 or 31 in FIG. 3.

Figure 9:
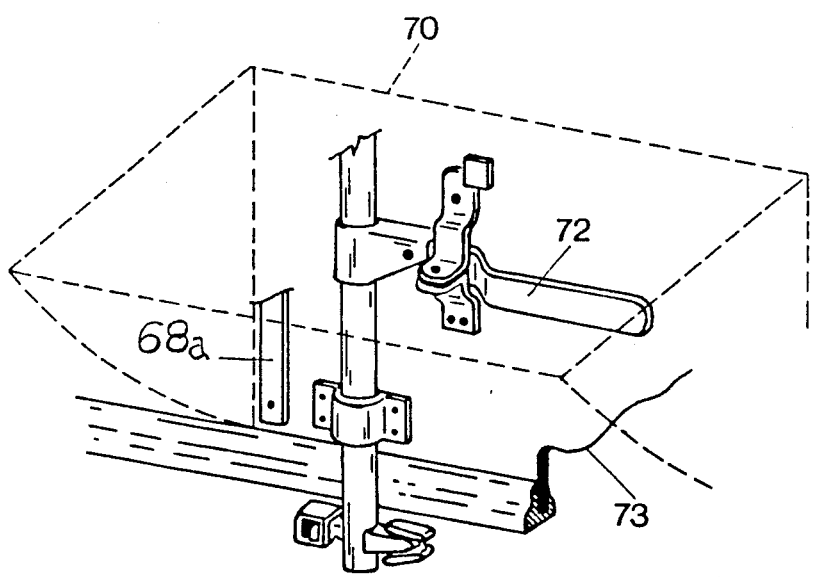
FIG. 9 is a perspective view of a locking arrangement for closing the doors located between the drag reducer and the rear panel of a truck.

FIG. 9 is a schematic illustration of an arrangement which provides access to the locking system 72 of the door 73. The dotted lines 70 illustrate the shape of the deflector surrounding the handle which is used to lock the doors at the rear of the truck. Such locking mechanism is positioned between securing plates 68a corresponding to plate 68 shown in FIG. 10.

The flexible material needed to make the drag reducer is not necessarily airtight as long as the material, when slightly torn does not split under the pressure of the air in the drag reducer. The size of the air inlet 30 shown in FIG. 3 or 60 shown in FIG. 8, needs to be of a sufficient dimension so as to compensate for the loss of air tightness for a material which is not fully airtight and must also be sufficiently large to supply sufficient air if the drag reducer is torn within acceptable limits.

It has been found that a truck having a rear panel of about 77 square feet has a drag of about 1248 pounds at 55 M.P.H. and a facing wind of about 15 M.P.H. for a conventional flat surface and less than 574 pounds for a convex surface corresponding to the applicant's drag reducer. A reduction of 54% of the drag is obtained.

The seal between the drag reducer and the door also need to be taken in consideration. For an opening being 1/64 of an inch wide and 640 inches long this corresponds to a 10 inches square opening. Accordingly, for the purpose of compensating such an opening, the air inlet such as 30 needs to be 10 inches square in cross-section. If the air inlet has a cross-section smaller than that, the drag reducer will never be allowed to reach its expected shape. Depending on the air tightness of the material per se, the cross-section of the opening 38, as shown in FIG. 4, will have to be computed accordingly. Furthermore, a security factor of two should be computed in case the material is slightly torn. In the case of the cross-section of 10 inches square, the dimension of the opening could be a rectangle 1.5 inch wide and 8 inches high, that is, 12 inches square. The long side of the opening lies against the side of the truck. It should be understood that the cross-section of the opening 38 should not be unecessarily large because too much pressure would be exerted on the material of the drag reducer and eventually could damage the latter.

The number of securing plates or anchors 68 necessary to hold the drag reducer can easily be computed as needed.

Although the shape of the drag reducer has been identified above as a semi-spherical dome, it is easier to manufacture the dome with material divided in a plurality of segments as shown in FIG. 3. Considering that the vertical cross-section of most of the trucks is rectangular, it is sufficient that the drag reducer has a substantially circular cross-section along a vertical and a horizontal plane defined by the lines 33 and 35.

It is pointed out that the present invention is not an inflatable balloon but should be refered to and was conceived as an aerodynamic deflector. A inflatable balloon can burst while the present invention remains operational even when it is torn. The present drag reducer makes use of a combined internal and external pressures.

The embodiments of the invention illustrated in FIGS. 2, 3, 4 and 8 identify the location of the air inlets such as 30 (FIG. 3) on the side near the upper level of the truck. This position does not interfere with the usual travelling conditions of the truck such as usual passageways for other vehicles travelling in the same or opposite direction. The air inlets can also be disposed at various levels on the side of the truck without changing the nature of the invention.

It is pointed out that the present aerodynamic deflector reaches its inflated shape through a progressive accumulation of air pressure supplied in a natural manner.

I claim:

1. A drag reducer adapted to be mounted behind a vehicle having a substantially flat rear face and lateral faces substantially perpendicular to said rear face, said reducer comprising a large piece of flexible material substantially air-tightly fixed along the periphery of said rear face adjacent said lateral faces, said piece of material being substantially air-tight and having an area larger than said rear face and adapted to display a convex surface when fully extended, said material being provided with a single opening located adjacent the periphery of said rear face, an air inlet tubular member having one end connected to said opening, the other end of said member adapted to project forwardly on one of the lateral faces of said vehicle, whereby, upon a forward movement of the vehicle, air is introduced in said air inlet tubular member and projected between said rear face and the piece of material to inflate the latter by gradually building air pressure inside said drag reducer forming a plano-convex air bag, the projection of air in said bag being substantially terminated when said plano-convex surface is fully extended.

2. A drag reducer as recited in claim 1, wherein said material is double folded over a flexible cable around the periphery of the door to form a double folded ledge, a securing plate mounted over said ledge and means for tightly fixing said plate to said door for sealing said cloth to said doors.

3. A drag reducer as recited in claim 1, wherein said material comprises two openings located adjacent the periphery of said rear face, adjacent two opposite lateral faces, and two air inlet tubular members having one end connected to each of said openings, the other end of said members projecting forwardly on the adjacent face of said opposite lateral faces.

4. A drag reducer as recited in claim 3, wherein the piece of material is subdivided in two portions, and wherein said rear face displays two doors hinged along said lateral faces and meeting along a a vertical central line each of said lateral faces and meeting along a vertical central line each of said portions are adapted to be fixed around the periphery of each of said doors for forming two semi plano-convex air bags, each of the latter bags having a central partition made of an additional piece of said material extending from said convex surface to said doors along a line away from said central line, allowing said bags, when inflated, to abut against each other along said convex surface.

5. A drag reducer as recited in claim 4, wherein said air inlet tubular members are made of flexible material whereby said members fold over the lateral faces of the vehicle when the doors are opened.

6. A drag reducer as recited in claim 1, the area of cross-section of the air inlet tubular members allows an inflow of air in the air bag slightly exceeding predetermined leaking outflow of air through and around said material.

7. A drag reducer as recited in claim 6, wherein the piece of material has a resistance adapted to compensate air pressure caused by an internal radial flow of air in said air bag with a tension on the outer surface of said air bag caused by a tangential flow of air due to the forward movement of the vehicle.

* * * * *